(12) United States Patent
Mueller et al.

(10) Patent No.: US 9,542,633 B2
(45) Date of Patent: Jan. 10, 2017

(54) MEMBRANE AND METHOD FOR THE PRODUCTION THEREOF

(71) Applicant: GEMÜ Gebr. Müller Apparatebau GmbH & Co. Kommanditgesellschaft, Ingelfingen (DE)

(72) Inventors: Gert Mueller, Kuenzelsau (DE);
Werner Floegel, Doerzbach (DE);
Matthias Fick, Kuenzelsau (DE)

(73) Assignee: GEMÜ Gebr. Müller Apparatebau GmbH & Co. Kommanditgesellschaft, Ingelfingen (DE)

( * ) Notice: Subject to any disclaimer, the term of this patent is extended or adjusted under 35 U.S.C. 154(b) by 0 days.

(21) Appl. No.: 14/906,229

(22) PCT Filed: May 26, 2014

(86) PCT No.: PCT/EP2014/060826
§ 371 (c)(1),
(2) Date: Jan. 19, 2016

(87) PCT Pub. No.: WO2015/010810
PCT Pub. Date: Jan. 29, 2015

(65) Prior Publication Data
US 2016/0162771 A1    Jun. 9, 2016

(30) Foreign Application Priority Data
Jul. 22, 2013 (DE) .................. 10 2013 214 304

(51) Int. Cl.
*G06K 19/07* (2006.01)
*F16K 37/00* (2006.01)
(Continued)

(52) U.S. Cl.
CPC .............. *G06K 19/0723* (2013.01); *F16J 3/02* (2013.01); *F16K 7/12* (2013.01); *F16K 37/0025* (2013.01); *G06K 19/07758* (2013.01)

(58) Field of Classification Search
USPC .................... 235/492, 488; 362/235, 249.02
See application file for complete search history.

(56) References Cited

U.S. PATENT DOCUMENTS

2005/0092079 A1    5/2005   Ales et al.
2005/0189408 A1    9/2005   Corbett, Jr.
(Continued)

FOREIGN PATENT DOCUMENTS

DE   102 43 699 A1   4/2004
EP   1 457 301 A1    9/2004
EP   2 242 004 A1    10/2010

OTHER PUBLICATIONS

International Search Report and Written Opinion of the International Searching Authority for PCT International Application No. PCT/EP2014/060826 mailed Sep. 12, 2014.
(Continued)

*Primary Examiner* — Allyson Trail
(74) *Attorney, Agent, or Firm* — Howard & Howard Attorneys PLLC

(57) ABSTRACT

A membrane which is provided with a membrane surface that represents the functional region of the membrane and which is provided with a tab that projects beyond the membrane surface is described. The membrane and the tab are constructed from a number of layers, wherein at least one of the layers consists of an elastomer. Arranged in the tab is an electronic data carrier. The tab has an upper and a lower layer. The data carrier is enclosed by the layers of the tab and the upper and the lower layer.

6 Claims, 1 Drawing Sheet

(51) Int. Cl.
*F16J 3/02* (2006.01)
*F16K 7/12* (2006.01)
*G06K 19/077* (2006.01)

(56) References Cited

U.S. PATENT DOCUMENTS

| | | | | |
|---|---|---|---|---|
| 2008/0044635 | A1* | 2/2008 | O'Neill | A63B 41/02 |
| | | | | 428/212 |
| 2008/0173097 | A1* | 7/2008 | Bauer | G01L 19/0069 |
| | | | | 73/756 |
| 2008/0201778 | A1 | 8/2008 | Guo et al. | |
| 2010/0059595 | A1* | 3/2010 | Longfu | G06K 19/027 |
| | | | | 235/488 |
| 2011/0240747 | A1 | 10/2011 | Stewart et al. | |
| 2011/0320142 | A1* | 12/2011 | Surman | G01L 9/0072 |
| | | | | 702/50 |
| 2012/0067433 | A1* | 3/2012 | Friedrich | B01L 3/502738 |
| | | | | 137/14 |
| 2012/0141999 | A1* | 6/2012 | Park | B01L 3/502715 |
| | | | | 435/6.12 |
| 2013/0239169 | A1* | 9/2013 | Nakhjiri | H04L 63/20 |
| | | | | 726/1 |
| 2013/0258658 | A1* | 10/2013 | Hussell | H01L 25/0753 |
| | | | | 362/235 |
| 2014/0081202 | A1* | 3/2014 | Tsoukalis | F04B 43/1253 |
| | | | | 604/67 |

OTHER PUBLICATIONS

Examination Report for German Application No. 10 2013 214 304.4 dated Feb. 21, 2014.

* cited by examiner

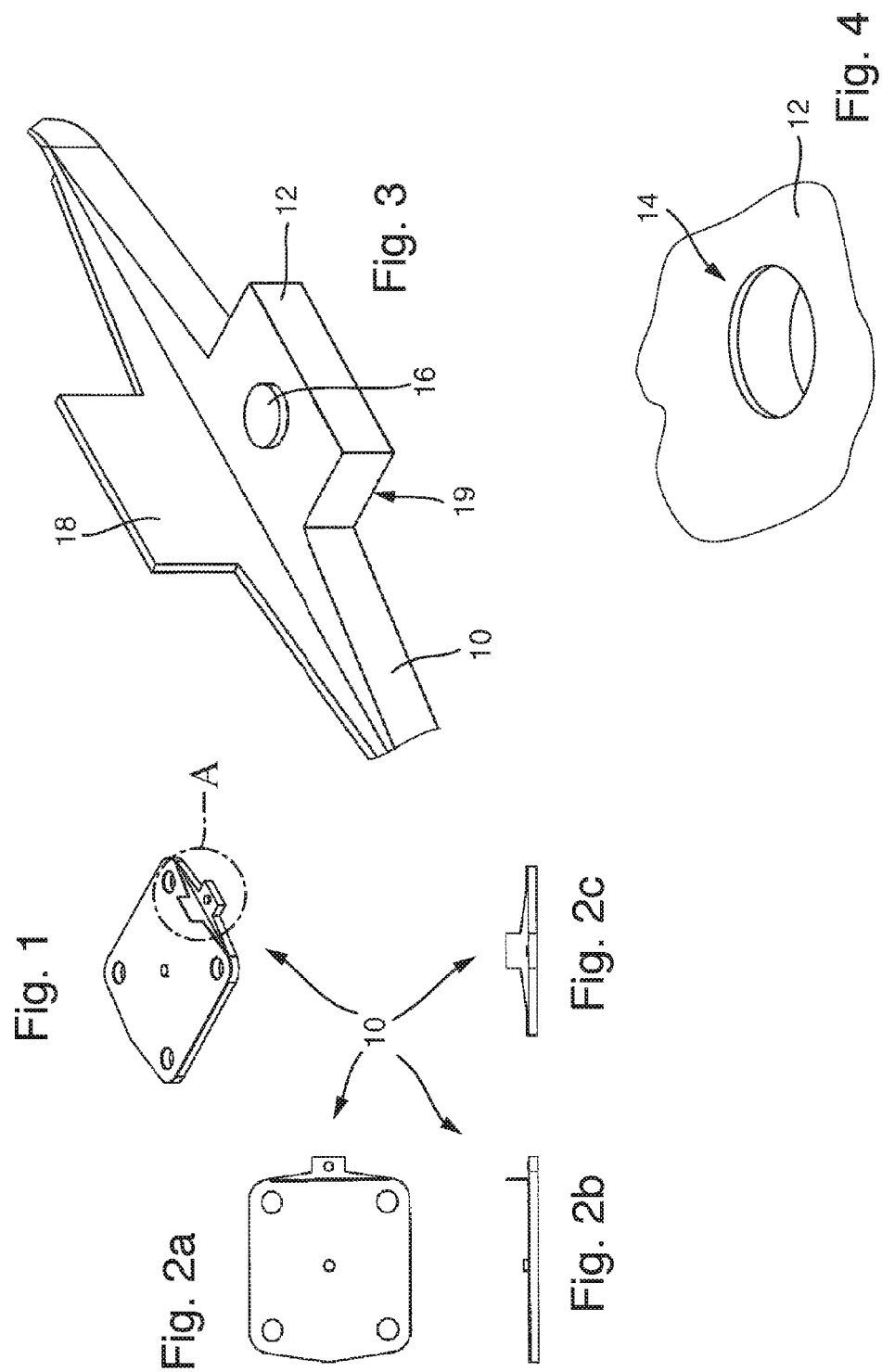

MEMBRANE AND METHOD FOR THE PRODUCTION THEREOF

CROSS-REFERENCE TO RELATED APPLICATIONS

The present application is a National Phase of International Patent Application No. PCT/EP2014/060826, filed on May 26, 2014, which claims priority to and all the benefits of German Patent Application No. 10 2013 214 304.4, filed on Jul. 22, 2013, both of which are hereby expressly incorporated herein by reference in their entirety.

BACKGROUND OF THE INVENTION

The invention relates to a membrane, wherein the membrane is constructed of numerous layers, and wherein at least one of the layers is made of an elastomer. It is known to print or have imprinted data on the membrane.

SUMMARY OF THE INVENTION

The invention relates to a membrane having data imprinted on the membrane, as well as a method for production of the membrane. The object of the invention is to improve the known membrane, in particular with regard to the allocation of data.

This object is achieved in that an electronic data medium is disposed in the membrane, in that the membrane has an upper and lower coating, and in that the data medium is enclosed by the layers of the membrane and the upper and lower coating.

Through the use of an electronic data medium, the possibilities for the allocation of data to the membrane are expanded to a nearly limitless extent. Thus, not only the data pertaining to the materials, the dimensions, the production and similar parameters of the membrane can be stored in the data medium, but also data pertaining to the respective client, the delivery and so on. All of this data can be oriented to the respective individual membrane thereby, and stored on the associated data medium.

By encasing the data medium in the layers of the membrane and the upper and lower coatings, protection of the data medium from environmental impacts as well as a protection from the operating medium of the membrane is obtained. In particular, oil or dirt or suchlike have no affect on the readability of data from the data medium.

In a further development of the invention, the membrane is provided with a tab, which extends beyond the membrane surface, and wherein the data medium is disposed in the tab.

As a result of the projection of the tab extending over the membrane surface and thus over the functional region of the membrane, as well as due to the arrangement of the data medium in the tab, it is possible to place a reading device in the proximity of the data medium, and data from the data medium can be read with the reading device. In particular, by this means, housing parts, for example, between which the membrane is incorporated, have no, or only a slight, affect on the placement of the reading device, or on the readability of the data.

In one design of the invention, the data medium is an RFID chip (RFID: Radio Frequency Identification). Preferably the RFID chip has a disk-shaped design. It is advantageous thereby when one disk surface of the RFID chip is oriented in a plane that is basically parallel to the surface of the membrane. Frequently an antenna is present in the RFID chip in the region of one of its disk surfaces. As a result of the basically parallel orientation of the disk surface to the membrane surface, it is possible to allocate the reading device to the antenna of the RFID chip particularly well. As a result, the reading of data from the data medium is improved.

With the method for the production of the membrane, it is provided that the pocket is formed as a recess in the respective material of the individual layers. If the layers of the membrane are subsequently applied to one another, then the pocket for the data medium is formed thereby. The data medium can then be placed in this pocket and vulcanized together with the laminated layers of the membrane.

It is particularly beneficial when a tool, in particular a mold, is used for the construction of the individual layers. By this means, a stable arrangement in terms of the position and orientation can be obtained.

Further features, application possibilities, and advantages of the invention can be derived from the following description of exemplary embodiments of the invention, which are depicted in the Figures. All of the described or depicted features form the subject matter of the invention thereby, in and of themselves or in any combination thereof, independently of their summary in the claims or their back references, as well as independently of their formulation or depiction in the description or in the Figures, respectively.

BRIEF DESCRIPTION OF THE DRAWINGS

FIG. 1 is a schematic perspective view of an exemplary embodiment of a membrane according to the invention;

FIG. 2a is a top view of the membrane illustrated in FIG. 1;

FIG. 2b is a side view of the membrane illustrated in FIG. 1;

FIG. 2c is a front view of the membrane illustrated in FIG. 1;

FIG. 3 is a perspective view of the detail A in FIG. 1; and

FIG. 4 is a perspective view of a pocket in the membrane from FIG. 1.

DETAILED DESCRIPTION OF THE INVENTION

A membrane 10 is depicted in FIGS. 1 to 4, which can be used, in particular, with a valve, by way of example in a pneumatically or hydraulically or electrically powered membrane valve. The membrane 10 has a basically rectangular membrane surface when viewed from above, and has a substantially uniform thickness transverse to the membrane surface. It is to be understood that the membrane 10 can also exhibit a differently shaped geometric form. By way of example, the membrane 10 can also be round.

The basically rectangular membrane surface represents the functional region of the membrane 10. The associated valve is built into the membrane 10 inside this functional region. By way of example, within this functional region, the membrane 10 can be disposed between two housing parts of the associated valve.

The membrane 10 has a tab 12 on one of the longitudinal sides. In the present exemplary embodiment, the tab 12 is designed as a basically rectangular projection, which extends beyond the basically rectangular membrane surface. The dimensions of the tab 12, in particular the extension of the tab 12 basically transverse to the associated longitudinal side of the membrane 10, are selected thereby such that the tab 12 may also extend beyond potentially present housing parts of the associated valve.

It is to be understood that the tab 12 can also exhibit a differently designed geometric shape. In some cases, the tab 12 may be omitted entirely.

The membrane 10 with the tab 12 is constructed from a plurality of layers, wherein each of the individual layers can be made of an elastomer or a fabric or a stabilizing layer or the like, and wherein the elastomers and the fabrics of the various layers can each be made from different materials, e.g. rubber or silicone or the like.

A pocket 14 is present in the tab 12. Reference in this regard is made to FIG. 4. The pocket 14 is disposed basically in the center of the basically rectangular tab 12. In the present exemplary embodiment, the pocket 14 has basically a circular shape, wherein the axis of the pocket 14 is oriented basically transverse to the surface formed by the tab 12. The pocket 14 has a depth in the axial direction, which depth is less than the thickness of the membrane.

An electronic data medium 16 is contained in the pocket 14. Reference in this regard is made to FIG. 3. The data medium 16 has a basically disk-shaped design and has a thickness in the axial direction. The dimensions of the pocket 14 and the data medium 16 are adjusted to one another such that the data medium 16 can be placed in the pocket 14 during the production of the membrane 10.

It is to be understood that the data medium 16 can also exhibit a differently designed geometric shape. The pocket 14 is then adapted to this shape appropriately. After it has been placed in the pocket 14, the data medium 16 can either extend over the pocket 14, as indicated in FIG. 3, or it can be accommodated in the pocket 14 without this projection.

The data medium 16 can be any electronic component on which data can be stored and read out. In particular, the data medium 16 can be a so-called RFID chip (RFID: Radio Frequency Identification), which typically has a transponder, in which data can be entered, which can then be read by a reading device using electrical waves.

When the membrane 10 is in the completed state, the pocket 14 is on the undersurface thereof, and its upper surface is sealed. In the present exemplary embodiment, this is obtained with an upper coating 18 as well as a lower coating 19. These two coatings 18, 19 form the lowermost and uppermost layers of the membrane 10 and the tab 12.

When the membrane 10 is in the finished state, the data medium 16 is embedded in the tab 12. In particular, the data medium 16 is encompassed by the material of the layers of the tab 12 as well as by the upper and lower coatings 18, 19. The data medium 16 is thus entirely contained inside the material of the layers as well as the upper and lower coatings of the membrane 10.

An access from the exterior to the data medium 16 is not available, and an exchange of the data medium 16 is likewise impossible, without destroying the embedding of the data medium 16 in the tab 12 described above.

In FIGS. 1 to 3, the upper coating 18 is depicted in the region of the tab 12, for illustrative purposes, such that it projects basically in a transverse direction away from the membrane 10. It should be noted that the coating 18 does not actually project in a transverse direction away from the membrane in the finished state, but that it is also oriented such that it is flat in the region of the tab 12, and thus attached, flush, to the layer of the membrane 10 beneath it. The pocket 14 is thus covered by the coating 18, and sealed, as stated above. The data medium 16 is thus contained in the tab 12, and surrounded by the material of the tab 12. The tab 12 extends thereby beyond the functional region of the membrane 10.

As stated above, the axis of the pocket 14, and thus the data medium 16, is oriented basically transverse to the surface formed by the tab 12. As a result, the upper and lower disk surfaces of the data medium 16 run in the present exemplary embodiment in a plane that is basically parallel to the membrane surface. Assuming that, in particular with an RFID chip, an antenna is frequently disposed in the region of upper or lower disk surfaces, it is possible to place a reading device above or below the tab 12 and thus directly next to the disk surface of the data medium 16, when the membrane is in the installed state, and to then read out the data.

Alternatively, it is also possible that the data medium 16 is disposed differently with its disk surface inside the tab 12. By way of example, it is possible that the disk surface of the data medium 16 runs basically parallel to the front longitudinal side of the tab 12. In this case it is possible to place a reading device in front of the front longitudinal side of the tab 12, and thus in front of the disk surface of the data medium 16, and then to read out the data medium 16, when the membrane 10 is in the installed state.

Furthermore, it is alternatively possible, that a data medium may be used that has a different shape than that shown in FIGS. 1 to 3. By way of example, this can be a rectangular or oval shape. In these cases, the data medium, in turn, can be disposed inside the tab 12 such that a reading device can be placed, to the greatest possible extent, directly opposite an antenna of the data medium.

Depending on the design of the tab 12 as well as depending on the shape of the data medium 16, or the arrangement of an antenna inside the data medium 16, respectively, it is possible to obtain an optimal position and orientation of the data medium 16 inside the tab 12 using the possibilities explained above, with respect to the best possible reception conditions.

If—as has been mentioned—the tab 12 is omitted, then the pocket 14 and the data medium 16 are disposed in the functional region of the membrane 10. Otherwise, all of the above explanations also apply in this case in a corresponding manner.

In the following, a possible method for the production of the membrane 10 shall be explained.

As explained above, the membrane 10 and the tab 12 are constructed of a plurality of layers. The desired outer contour of the membrane 10 with the tab 12 is first cut out of the respective materials for the individual layers. By way of example, this outer contour is stamped out of the provided elastomers as well as out of the provided fabric materials. The pocket 14 in the tab 12 is likewise taken into account thereby, and removed form the respective material in the manner of a recess.

In a corresponding manner, the upper and lower coatings 18, 19 are also cut out of the provided material, wherein no recess is removed here for the pocket 14.

Subsequently, the individual cut-out layers of the membrane 10 and the tab 12 are layered in the desired order and inserted in a tool, in particular a mold. In the framework of these measures, in particular prior to application of the upper coating 18 on the underlying layers of the membrane 10, the data medium 16 is placed in the pocket 14.

Subsequently, the construction of the layers of the membrane 10 present in the tool, together with the data medium 16 contained therein, are vulcanized.

If the data medium 16 extends beyond the tab 14, as mentioned above, then this projection is compensated for in the aforementioned vulcanization of the membrane 10. By way of example, it is possible that the projection of the data medium 16 is pressed into the associated coating 18, 19.

For purposes of adjustment of the layers that have been cut out to one another, it is possible that a cylindrical component is inserted in the recesses forming the pocket 14 in the individual layers. This component can be removed after the construction of the entire membrane 10, or it may remain in the membrane 10, wherein, in this case, the data medium 16 is then placed in the cylindrical component.

The method explained above also applies in the case that the tab 12 is not included. As has already been mentioned, in this case the pocket 14 is disposed in the functional region of the membrane 10.

It is to be understood that other production methods for the membrane 10 and, if applicable, the tab 12, are also conceivable.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A membrane for a membrane valve comprising a plurality of layers, at least one of said plurality of layers is an elastomer, the membrane further including
    an upper and lower coating,
    a membrane surface, which represents a functional region of the membrane,
    a projection, which extends beyond the membrane surface, and which transverses a longitudinal side of the membrane, and
    an electronic data medium disposed in the projection, and wherein said electronic data medium is enclosed by the layers of the membrane and the upper and lower coatings.

2. The membrane as set forth in claim 1, wherein an RFID chip (RFID: Radio Frequency Identification) is present as the electronic data medium.

3. The membrane as set forth in claim 2, wherein the RFID chip is designed in the shape of a disk.

4. The membrane as set forth in claim 3, wherein a disk surface of the RFID chip is oriented in a plane that is basically parallel to the membrane surface.

5. A method for the production of a membrane for a membrane valve where the membrane has a plurality of layers, said method comprising the steps of:
    cutting an outer contour of the membrane and a projection out of the plurality of layers, wherein the projection is intended to extend beyond the membrane surface, and to transverse a longitudinal side of the membrane,
    forming a pocket as a recess in the respective materials of the individual layers;
    cutting the outer contour of the membrane, and the projection out of upper and lower coatings;
    placing individually cut-out layers on top of one another, and placing an electronic data medium in the pocket; and
    vulcanizing the construction of the layers of the membrane, and data medium contained therein.

6. The method as set forth in claim 5, wherein a tool, in particular a mold, is used to assemble the individually cut-out layers.

* * * * *